Aug. 2, 1960   D. P. STRANG ET AL   2,947,894
WINDING FOR POLYPHASE ALTERNATING CURRENT DYNAMOELECTRIC MACHINE
Filed Sept. 15, 1958                           6 Sheets-Sheet 1

Inventors:
Donald P. Strang,
William A. Garvey,
by H. F. Manbeck, Jr.
Their Attorney.

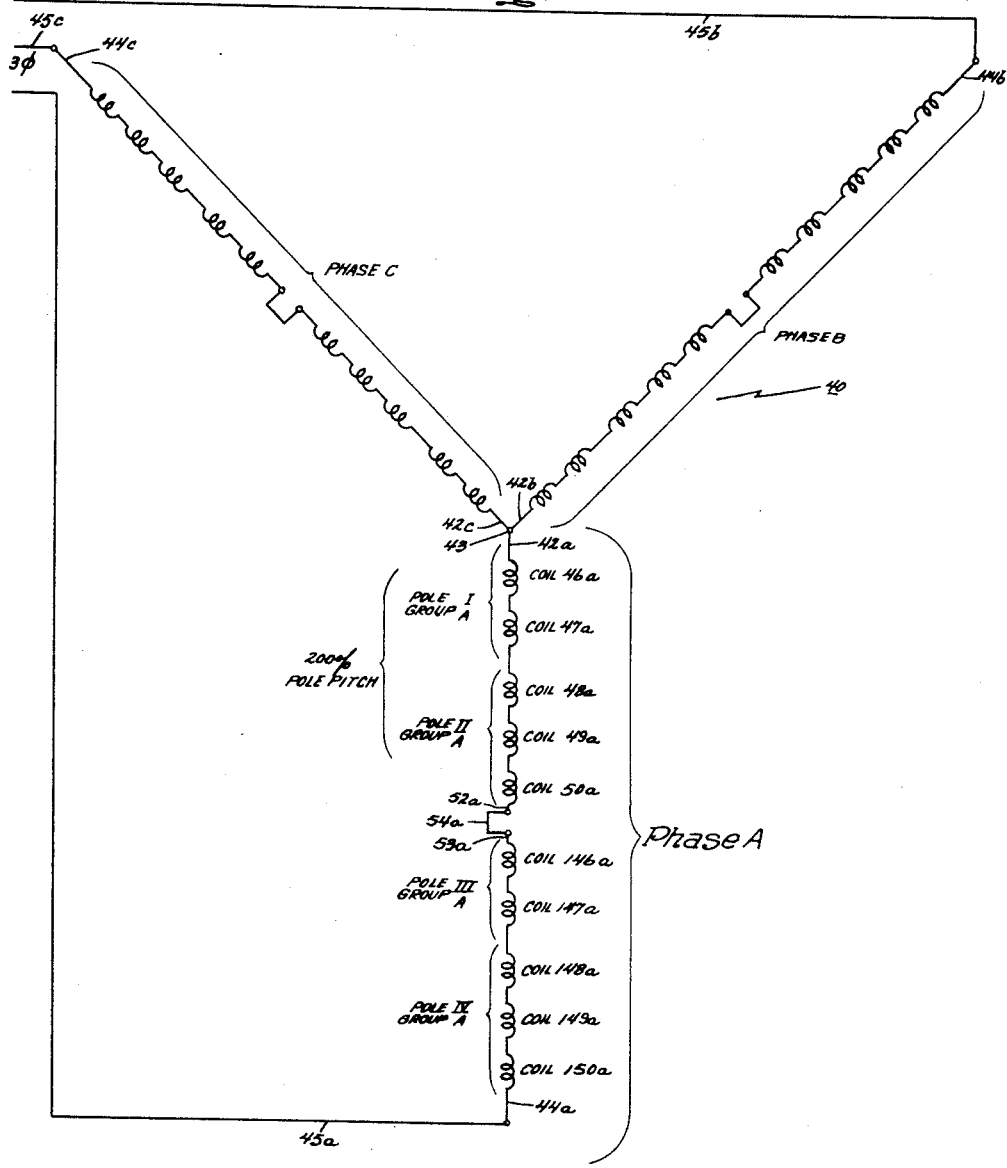

Aug. 2, 1960

D. P. STRANG ET AL 2,947,894

WINDING FOR POLYPHASE ALTERNATING CURRENT DYNAMOELECTRIC MACHINE

Filed Sept. 15, 1958

Inventors:
Donald P. Strang,
William A. Garvey,
by H. F. Manbeck, Jr.
Their Attorney.

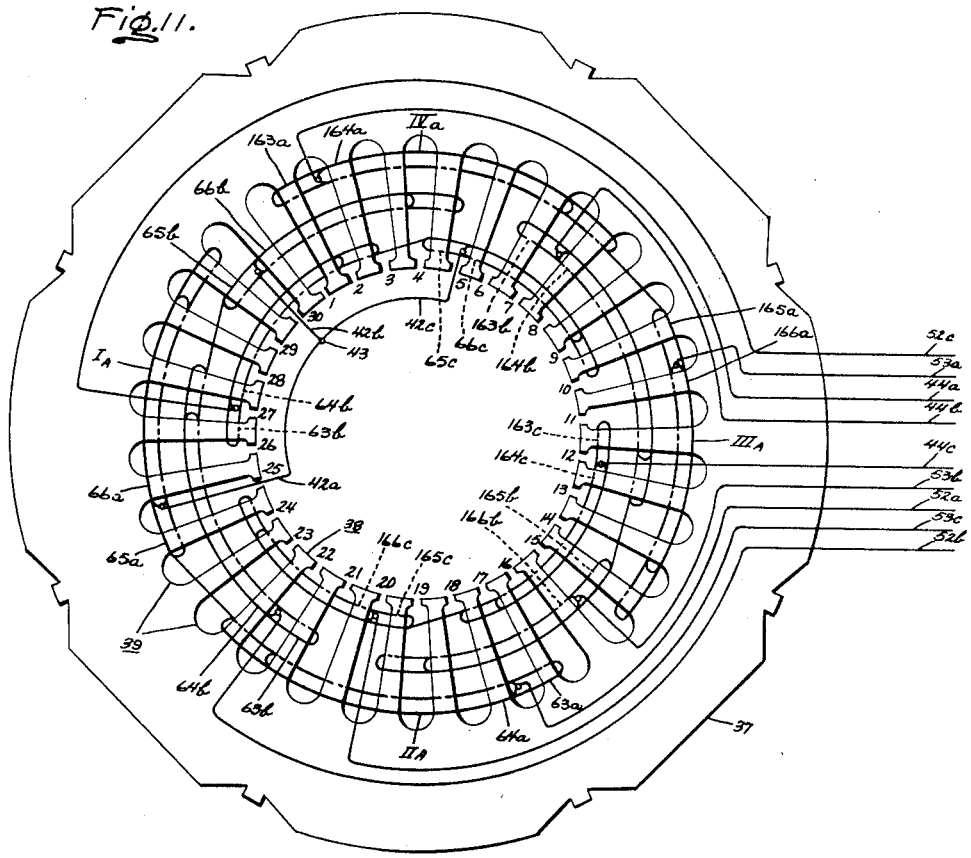

United States Patent Office 2,947,894
Patented Aug. 2, 1960

2,947,894

WINDING FOR POLYPHASE ALTERNATING CURRENT DYNAMOELECTRIC MACHINE

Donald P. Strang and William A. Garvey, Fort Wayne, Ind., assignors to General Electric Company, a corporation of New York Filed Sept. 15, 1958, Ser. No. 761,228

13 Claims. (Cl. 310—202)

This invention relates to polyphase alternating current dynamoelectric machines, such as polyphase alternating current induction motors, and more particularly to a polyphase alternating current winding for such machines.

Most common varieties of electric motors fundamentally embody the same principle of operation, i.e., the positioning of a current-carrying conductor in a magnetic field; the flow of current in the conductor produces magnetic lines of force concentric therewith which react with the magnetic lines of force of the field to produce a physical force tending to move the conductor out of the field. A classic variety of electric motor for operation from a source of alternating current is the induction motor in which one of the core members, generally the rotor, is provided with a short-circuited winding and the other core member, generally the stator, is provided with a field exciting winding. With this arrangement, energization of the field exciting winding from a source of alternating current induces a heavy current flow in the short circuited winding by transformer action, this heavy current flow cooperating with the magnetic flux produced by the field exciting winding to provide a rotational force. Mere energization of the field exciting winding from a single phase source of alternating current will not, however, provide the requisite rotational force initially to start an induction motor since the alternating magnetic field and the resultant induced alternating current in the short circuited winding produce alternating equal and opposite rotational forces; a rotating magnetic field must be provided in order to start an induction motor. Such a rotating magnetic field is most conveniently provided by energizing the field exciting winding of the machine from a source of polyphase alternating current, such as the three phase alternating current power commercially supplied by utilities in the United States.

In the case of an induction motor to be energized from a source of polyphase alternating current, the field exciting winding conventionally is divided into a plurality of portions or phases, generally equal in number to the number of phases in the source of polyphase alternating current; in the case of a machine to be operated from a three-phase source of alternating current, the field exciting winding conventionally is formed of three phases which may be connected either in Y or Δ across the three phase source. Each phase of the field exciting winding in turn conventionally comprises one or more pairs of sections or "pole groups," each in turn comprising one or more individual coils; the winding sections or pole groups of each phase are disposed on a magnetic core member so as to form the desired number of magnetic poles, e.g., in the case of a four pole motor, each winding phase will comprise four sections or pole groups, with each of the pole groups being formed of one or more individual coils.

A magnetic core member on which the field exciting winding is positioned is, in the case of polyphase induction motors, most commonly the stator member, concentrically surrounding the rotor member and defining an air gap therewith. The stator core member of conventional polyphase alternating current induction motors has a plurality of winding slots extending radially inwardly from its surface which defines the air gap with the rotor member, the slots being generally equally spaced around the air gap defining surface or bore. The coils which form the respective winding phases have their sides disposed in these winding slots, and a machine of this type is customarily referred to as having a "distributed" winding. In the past, polyphase alternating current induction motors have commonly been provided with a so-called "lap" winding; in the lap winding, each coil has a first side disposed in the bottom of a winding slot and second side disposed over the first side of another coil. This overlapping relationship of the coils proceeds completely around the stator core member and it is thus seen that it is necessary that there be provided one coil for each stator core member winding slot. Furthermore, it has been found difficult to wind the coils of a lap winding directly into the slots of the stator core member by machine and the placing of preformed coils into the stator core member slots by hand is time consuming and expensive.

Another form of winding arrangement which has been in common use for many years in single phase alternating current induction motors and which has found increasing favor in polyphase alternating current induction motors is the so-called "concentric" winding; in the concentric winding, all of the coils comprising a given pole group are concentrically arranged and all are positioned at the same radial depth in their respective slots. Thus, for example, a pole group in a polyphase concentric winding may comprise three concentrically disposed coils, the outer coil spanning nine core member teeth (defined by the winding slots), the intermediate coil spanning seven teeth and the inner coil spanning five teeth, all of the coils of the given pole group being disposed in the same relative depth position in their respective slots, i.e., for example at the bottom thereof. The use of concentric windings in polyphase alternating current induction motors permits closer control of space harmonic mmfs and reductions in stator resistance and end turn height. Furthermore, concentric windings lend themselves much more readily to machine winding directly into the slots of the stator core member, and, even if such windings are hand placed, the task involved is greatly simplified. In addition, by the use of concentric windings, the total number of coils in a given winding can be made less than the number of slots in the stator core member which may permit the use of a simplified phase insulation system involving fewer individual pieces of insulation respectively having a simpler configuration.

In an application Serial No. 672,296, filed July 16, 1957 by George B. Dunn, Jr. now Patent No. 2,905,840 and assigned to the assignee of the present application, there is disclosed a concentric winding arrangement for polyphase alternating current induction motors in which the number of coils in the winding are equal to the number of stator slots, but in which the turns per coil are essentially different in each coil of a given pole group in order to improve resistance and space harmonic mmfs.; in that arrangement, the coils comprising the winding are so arranged that each slot of the stator core member has the same number of turns therein in order thereby to provide equal slot fullness, a most desirable condition for optimum utilization of magnetic material and copper. In Patent No. 2,796,543, issued June 18, 1957 to George B. Dunn, Jr., and likewise assigned to the assignee of the present application, there is disclosed another concentric winding arrangement for a polyphase alternating current induction motor in which the ratio of the number of coils to the number of stator slots is larger than 0.5 and smaller than 1.0, with the coils comprising the winding again being so proportioned and disposed that equal slot fullness in the stator core member is provided.

The concentric winding arrangements of both the aforesaid application and patent are, however, suitable for use only in designs in which the number of stator core member winding slots per pole per phase is an integer. For example, the concentric winding arrangements of the aforesaid application and patent are usable in a thirty-six slot, four pole induction motor design since an integral number of slots per pole are provided, i.e., nine, but these arrangements are not usable with a thirty-slot four pole design since the number of slots per pole is not an integer, i.e., seven and one-half. In the concentric winding arrangements of George B. Dunn, Jr.'s application and patent, each pole group is symmetrical with all other pole groups, the number of coils in any pole group of any phase of the winding being equal in number to the number of coils of every other pole group, and while the turns per coil and the spans of the coils in a given pole group vary, they have a one-to-one correspondence with the turns per coil and spans of the respective coils of all other pole groups.

As indicated, the concentric winding arrangements of the aforesaid application and patent are not usable in a design in which the slots per pole is not an integer. It is therefore desirable to provide a concentric winding arrangement for a polyphase alternating current dynamoelectric machine which may be employed in designs in which the slots per pole is a non-integer. It is further desirable that such a concentric winding arrangement retain the improvements in resistance and space harmonic mmfs. and the desirable characteristics of equal slot fullness and the possibility of employment of a ratio of coils to winding slots less than 1.0 realized in the prior concentric winding arrangements of the aforesaid application and patent of George B. Dunn, Jr.

We have found that a concentric winding arrangement may be provided for stator core members having a non-integral number of slots per pole with the advantages of equal slot fullness and improvement in resistance and space harmonic mmfs. being retained, by arranging adjacent pole groups of each phase of the winding so that they have unequal spans and are thus asymmetrical, but retaining symmetry between adjacent pairs of poles. We have further found that with such an asymmetrical arrangement of adjacent pole groups, a reduction in the number of coils required can be effected in certain designs in which the ratio of winding slots to poles is integral and in which it would be supposed that the prior concentric winding arrangements employing symmetrical pole groups would be desirable.

It is therefore an object of our invention to provide an improved concentric winding arrangement for polyphase alternating current dynamoelectric machines.

Another object of our invention is to provide a concentric winding arrangement for polyphase alternating current dynamoelectric machines in which the ratio of winding slots to poles is a non-integer.

A further object of our invention is to provide a concentric winding arrangement for polyphase alternating current dynamoelectric machines in which the ratio of winding slots to poles is a non-integer and which retains the advantages of equal slot fullness and the improvements in resistance and space harmonic mmfs. obtained with prior concentric winding arrangements which were applicable only in constructions having an integral number of winding slots per pole.

Yet another object of our invention is to provide a concentric winding arrangement for polyphase alternating current dynamoelectric machines in which adjacent pole groups in each phase are not symmetrical, but with symmetry existing between adjacent pairs of pole groups.

Further objects and advantages of our invention will become apparent by reference to the following description and the accompanying drawings, and the features of novelty which characterize our invention will be pointed out with particularity in the claims annexed to and forming a part of this specification.

Our invention, in its broader aspects therefore contemplates a concentric polyphase winding positioned in the winding slots of the magnetic core member of a polyphase alternating current dynamoelectric machine, the winding having a plurality of phases with each of the winding phases having an even number of sections or pole groups disposed to form a corresponding even number of poles in the core member, the pole pitch or span of adjacent sections of each winding phase being unequal. More particularly, each of the winding phases comprises an even number of pole groups of coils with the span of each pole group of each winding phase being different than the span of its adjacent pole group but with each adjacent pair of pole groups of each winding phase having the same total span as all other adjacent pairs of pole groups of the winding, and with alternate pole groups of each winding phase further having an equal number of coils respectively having equal numbers of turns.

In the drawings, Fig. 1 is a schematic view of a thirty-six slot stator core member for a three phase alternating current induction motor having the concentric winding arrangement of our invention arranged to provide four poles;

Fig. 4 is another diagrammatic view of the winding of Fig. 1 which is also helpful in gaining an understanding of our invention;

Fig. 11 is yet another schematic view showing a thirty slot stator core member for a three phase alternating current induction motor incorporating yet another embodiment of our invention arranged to provide four poles;

Fig. 12 is another fragmentary view, partly in cross-section, showing the distribution of the coils of the concentric winding of Fig. 11 within the slots of the stator core member.

Figure 13:
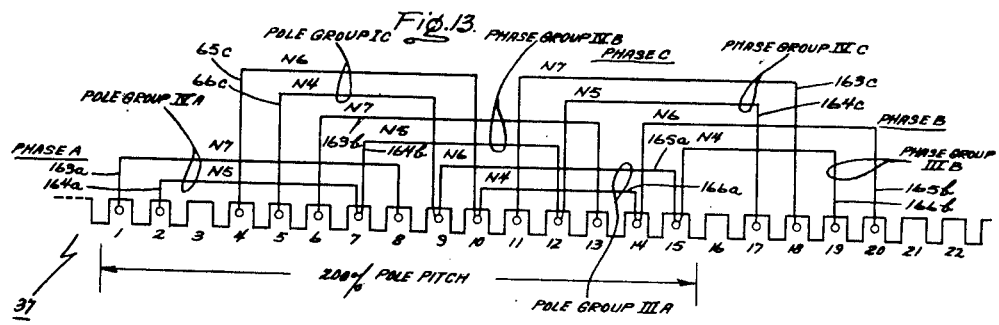
Fig. 13 is another diagrammatic view showing the concentric winding arrangement of Fig. 11.
Figure 7:
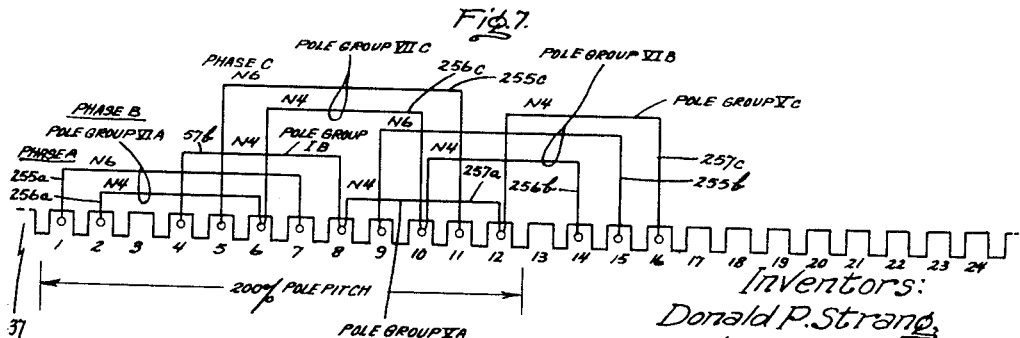
Fig. 7 is a diagrammatic view of the concentric winding arrangement of Fig. 5.
Figures 5, 6:
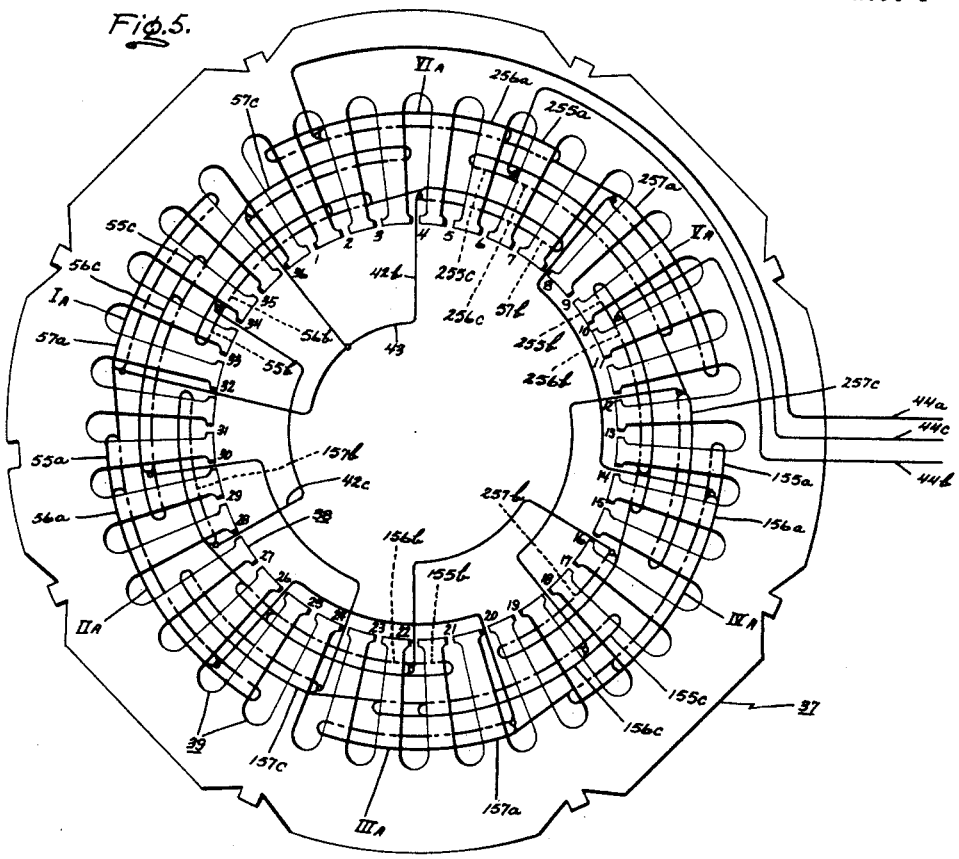
Fig. 5 is another schematic view of a thirty-six slot stator core member for a three phase alternating current induction motor incorporating another embodiment of our invention arranged to provide six poles.
Fig. 6 is a fragmentary view, partly in cross-section, showing the distribution of the coils of the concentric winding of Fig. 5.

Referring now to the drawings, it will be seen that the concentric winding arrangement shown in the embodiment of Figs. 1, 2, 3 and 4 and the embodiment of Figs. 5, 6 and 7 are of the type in which an integral number of core member winding slots per pole are provided, hereinafter referred to as a type (a) arrangement, while the concentric winding arrangements shown in the embodiment of Figs. 8, 9 and 10 and the embodiment of Figs. 11, 12 and 13 are of the type in which an integral number of core member winding slots per pole is not provided, but the number of winding slots per pair of poles is integer; this arrangement will be hereinafter referred to as a type (b) arrangement.

Figure 1:
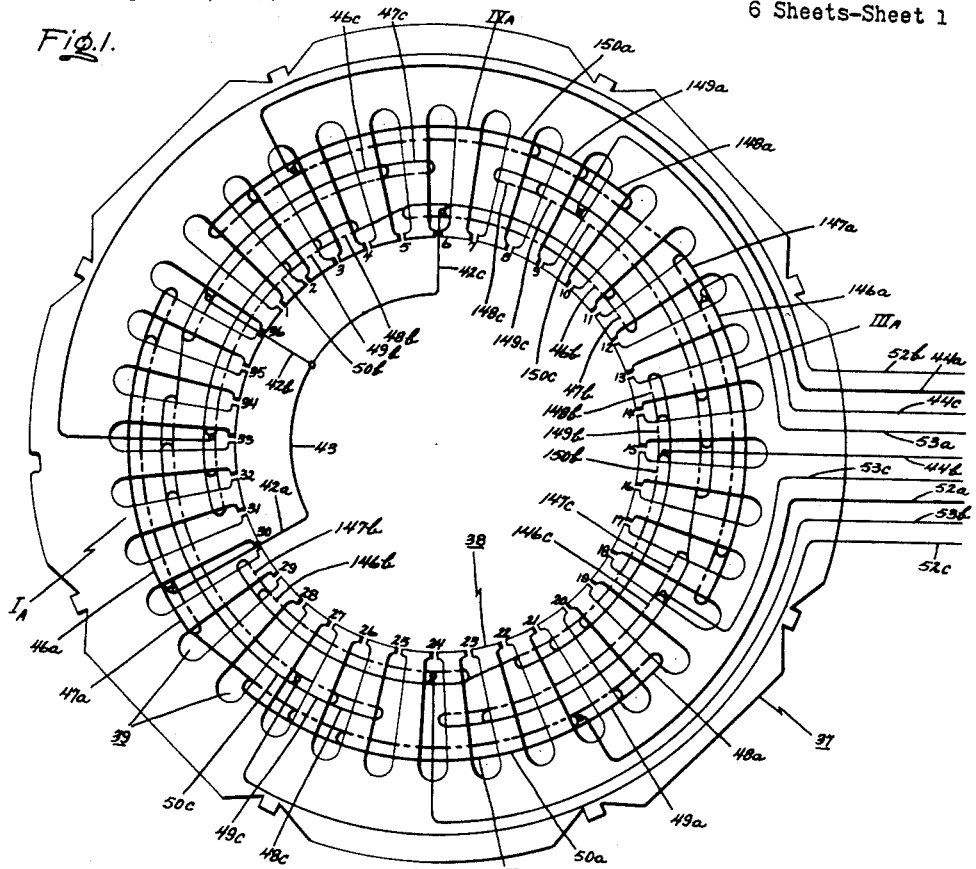

Referring now to Figs. 1 through 4, inclusive, in which a four pole thirty-six slot, i.e., type (a), concentric winding arrangement is shown, a stator core member 37 is provided which may be conventionally formed of a stack of relatively thin laminations punched from suitable magnetic material, as is well known in the art. Stator core member 37 has a central concentric bore 38 which defines an air gap with the rotor member (not shown), which may be a conventional squirrel cage induction motor rotor. A plurality of evenly spaced winding slots, generally identified as 39, extend radially outward from the air gap defining surface 38. For purposes of explanation of our improved concentric winding arrangement, the winding slots 39 are consecutively numbered from 1 to 36, as shown in Fig. 1.

Referring now momentarily to Fig. 4, our improved polyphase field exciting winding 40 comprises three portions or winding phases identified as phase A, phase B, and phase C. Each of the winding phases comprises four sections or pole groups I, II, III, and IV with alternate pole groups I and III respectively having two coils 46, 47 and 146, 147 and the other alternate pole groups II and IV respectively having three coils 48, 49, 50, and 148, 149, 150. The pole groups I and II have their coils 46 through 50 connected in series with their inner ends 42 connected together, as at 43 to provide a conventional Y connection, and the other pole groups III and IV are likewise serially connected. In Fig. 4, the outer ends 52 of the pole groups I and II and the ends 53 of the pole groups III and IV are shown as being serially connected by connections 54, and the outer ends 44 of pole groups III and IV are shown as being respectively connected to a three phase source of alternating current (not shown) by conductors 45. It will be readily understood that the pole groups I and II, and III and IV may be connected in parallel as well as in series as shown, as is well known in the art, and that the specific interconnection of the coils forming the pole groups and their connection to the source of polyphase alternating current does not form a part of our invention. It will be recognized that each of the pole groups I, II, III and IV of each phase form a magnetic pole in the stator core member 37.

Figure 3:
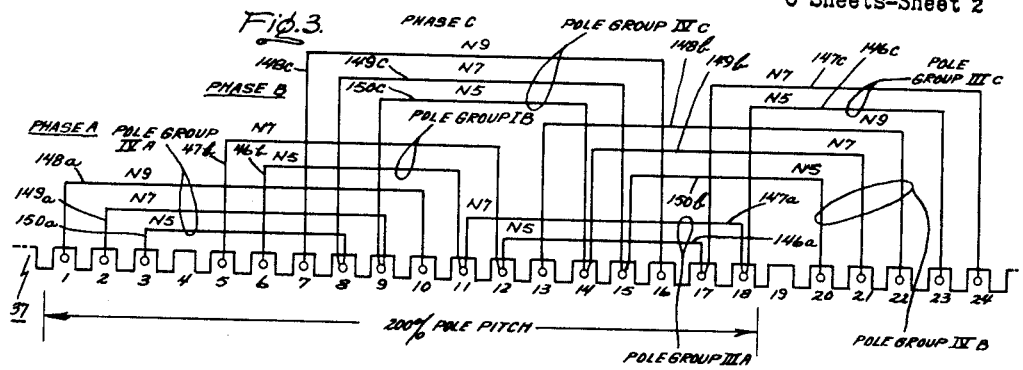
Fig. 3 is a diagrammatic view of the winding arrangement of Fig. 1 useful in explaining our invention.

Turning now additionally to Figs. 1 and 3, it will be seen that pole group IVA spans slots 1 through 10 while pole group IIIA spans slots 11 through 18. Since the stator core member 37 of Fig. 1 has thirty-six slots and the winding 40 provides four poles, the ratio of slots per pole is an integer, i.e., nine, and thus one hundred percent (100%) pole pitch of the stator core member 37 of Fig. 1 is nine. It is thus seen that pole group IVA has one-hundred percent (100%) pole pitch since it spans nine slots (more accurately it spans nine teeth which define the slots) while the pole group IIIA has a span of less than one hundred percent (100%) pole pitch since it spans only seven slots (seven teeth). It will further be seen, however, that the total span of the adjacent pole groups IVA and IIIA is two hundred percent (200%) of pole pitch, i.e., eighteen slots. More specifically and accurately, it will be seen that coil 148a of pole group IVA has a span of one hundred percent (100%) pole pitch, i.e., nine slots, and that the other two coils 149a and 150a have their spans decreasing in steps of two slots, i.e., coil 149a spans between slots 2 and 9 for a total span of seven slots, and coil 150a spans between slots 3 and 8 for a total span of five slots. It will likewise be seen that coil 147a of pole group IIIA spans between slots 11 and 18 for a total span of seven slots and that coil 146a spans between slots 12 and 17 for a total span of five slots. It is thus seen that the adjacent pole groups IVA and IIIA of phase A do not have the same spans, i.e., they are asymmetrical and that they have an odd number of coils, i.e., five, one coil only of pole group IVA having a one hundred percent (100%) span with the remaining coils of pole group IVA having spans decreasing in steps of two slots and the coils of the other adjacent pole group IIIA having respectively the same spans as the remaining coils 149a and 150a of pole group IVA.

Inspection of Fig. 1 will reveal that pole groups IA and IIA are respectively identical to pole groups IIIA and IVA having respectively the same spans and the same number of coils. It is thus seen that while adjacent pole groups of phase A are asymmetrical, adjacent pairs of pole groups are symmetrical, i.e., pole groups IA and IIA as a pair are symmetrical with pole groups IIIA and IVA as a pair. It is further seen that the corresponding pole groups of the other phases B and C, i.e., IB through IVB and IC through IVC are respectively identical with the phase groups IA through IVA.

Figure 2:
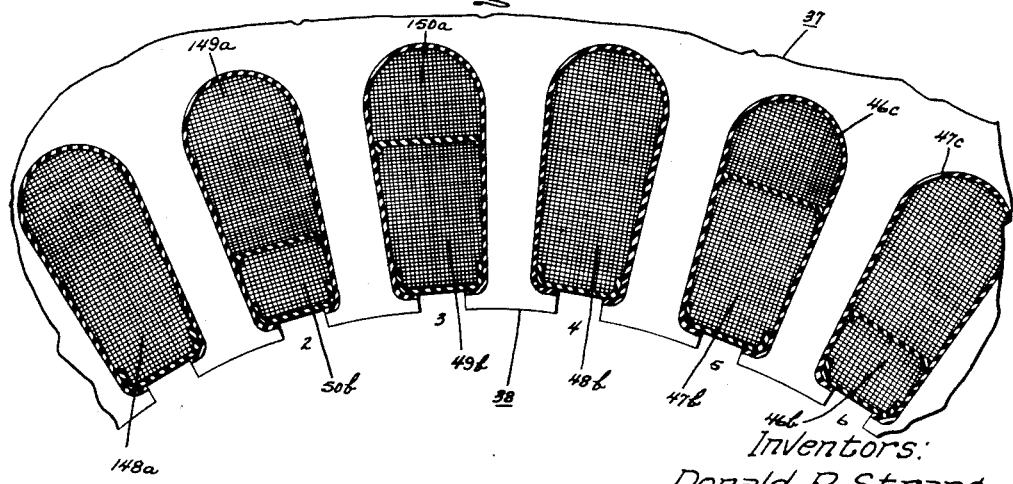
Fig. 2 is a fragmentary view, partly in cross-section, showing the distribution of the coils of the winding of Fig. 1 within the winding slots of the stator core member.

Referring now specifically to Figs. 2 and 3, it will be seen that each of the one hundred percent (100%) span coils 148a, 148b and 148c has sides which completely occupy a respective winding slot to the exclusion of any other winding. Thus, coil 148a spans slots 1 and 10 with its sides respectively completely filling those slots, coil 148c spans slots 7 and 16 with its sides respectively completely filling those slots, and coil 148b spans slots 13 and 22 with its sides respectively completely filling those slots; coils 148a, 148b, and 148c are therefore referred to as having N9 turns since each spans 9 slots. It will next be seen that coil 149a spans slots 2 and 9 but has its side in slot 9 sharing that slot with a side of coil 150c which spans slots 9 and 14. Likewise, coil 149c spans slots 8 and 15, having its side in slot 8 sharing that slot with a side of coil 150a having a side in slot 15 sharing that slot with a side of coil 150b. Coil 150c likewise spans slots 9 and 14, having one side in the slot 9 sharing that slot with a side of coil 149a and having its other side in slot 14 sharing that slot with the side of coil 149b. Coils 149a, 149b and 149c are therefore referred to as having N7 turns since they respectively span seven slots, and coils 150a, 150b and 150c are referred to as having N5 turns since they respectively span five slots.

It will further be seen that windings 147a and 146a of pole groups IIIa respectively span slots 11 and 18, and 12 and 17 with their sides respectively sharing slots 11 and 12 with sides of coils 46b and 47b of pole group IIIb and sharing slots 17 and 18 with sides of coils 147c and 146c of pole group IIIc. Coils 46a through 46c and 146a through 146c are thus referred to as having N5 turns since they respectively span five winding slots while coils 47a through c and 147a through c are referred to as having N7 turns since they respectively span seven winding slots.

It will now be seen that in the winding arrangement of Figs. 1 through 4, thirty coils are provided in the winding phases A through C which therefore provides a ratio of coils to slots of 5/6. It is further seen that each slot carries either N9 turns or N7+N5 turns and that with N7+N5 turns being made equal to N9 turns, the desired objective of equal slot fullness is obtained, as shown in Fig. 2.

It is thus seen that in the concentric winding arrangement of Figs. 1 through 4, inclusive, which is of the (a) type, adjacent winding sections or pole groups of each winding phase have unequal spans and are thus asymmetrical while adjacent pairs of winding sections or pole groups of each winding phase have equal total spans, i.e., are symmetrical. More particularly, one coil of one pole group of each pair of pole groups in each winding phase has a span of one hundred percent (100%) with the remaining coils in that pole group having their spans decreasing in steps of two slots and with the adjacent pole group of the pair of pole groups having the same number of coils as the remaining coils of the first pole group of the pair, these coils being respectively equal in span and number of turns with the remaining coils in the first pole group of the pair. It is thus seen that while the remaining coils of the first pole group may vary in turns per coil as well as in span, they maintain a one-to-one correspondence in turns per coil and in the span with the respectively corresponding coils in either of the adjacent pole groups of the same winding phase. It will further be seen that each pair of adjacent poles has an odd number of coils (five in the embodiment of Fig. 1) and it can be said that each pole group in each winding phase is identical with the exception of alternate pole groups in each winding phase which have an additional 100% pitch coil. The above described arrangement permits of variations in space harmonic mmfs and resistance without the loss of desirable equality and slot fullness by means of variations in turns per coil in all but the 100% pitch coils.

While it is considered desirable that the ratio of coils to slots should not exceed one for practical winding considerations, larger ratios are possible, and thus it is seen that in the embodiment of Figs. 1 through 4, inclusive, an additional coil having N3 turns can be added to each of the pole groups I through IV to provide a coil-to-slot ratio of 7/6 which, however, still permits of the desirable flexibility of turns per coil. In order to maintain the desired constant slot fullness with the coil-to-slot ratio of 7/6, each slot would now carry a side of an N9 coil plus two N3 coil sides, or sides of $N7+N5$ coils, i.e., $N9+2N3=N7+N5$.

It will be readily understood that while the concentric winding arrangement of Figs. 1 through 4 is shown as applied in a thirty-six slot, four pole arrangement, it is equally applicable to any arrangement having the same ratio of slots to poles, i.e., nine, and is thus applicable to a six pole, fifty-four slot stator, an eight pole seventy-two slot stator, or a two pole, eighteen slot stator.

Referring now to Figs. 5, 6 and 7 of the drawing, there is shown another type (a) concentric winding arrangement, i.e., in which an integral number of slots per pole is provided in the stator core member, the concentric winding arrangement of Figs. 5, 6 and 7 being embodied in a thirty-six slot six pole stator core member in which the ratio of slots to poles is thus six to one. Here, with like parts indicated by like reference numerals, it is seen that the stator core member 37 is again provided with thirty-six evenly spaced winding slots 39 extending radially outwardly from its bore 38, the slots 39 again being serially numbered 1 through 36. In this concentric winding arrangement, since six poles are provided, each phase of the winding comprises six pole groups respectively identified as I through VI. In Fig. 5, the phases A through C are shown as having their pole groups I through VI respectively directly serially connected with only the ends 44a, b and c being brought out and with the inner ends 42a, b and c being respectively connected together, as at 43, to provide the Y connection. It will here be seen that each adjacent pair of pole groups in each phase, i.e., VI and V, IV and III, II and I, respectively comprise two coils and one coil, identified as 255, 256 and 257, 155, 156 and 157, and 55, 56 and 57.

Referring now particularly to Fig. 7 in which one 200% pole pitch segment of the concentric winding of Fig. 5 is shown, i.e., slots numbered 1 through 12, it will be seen that the coils 255 respectively embrace six slots while the coils 256 and 257 respectively embrace four slots. Recalling now that in accordance with our invention, while adjacent pole groups of each winding phase have unequal spans, i.e., are asymmetrical, each pair of adjacent pole groups has a respective one-to-one correspondence in span and turns with every other pair of pole groups, it will be seen that the coils 155 and 55 likewise have spans of six slots and that the 156 and 56, and 157 and 57 likewise have spans of four slots. Thus, in inspecting Fig. 7, it will be seen that coil 255a of pole group IVA of phase A extends between slots 1 and 7 for a span of six, coil 256a of pole group VIA extends between slots 2 and 6 for a span of four, and coil 257a of pole group VA extends between slots 8 and 12 for a span of four. Similarly, coils 255c and 256c of pole group VIC respectively extend between slots 5 and 11 and 6 and 10 for spans of six and four respectively and coils 255b and 256b of pole group VIB extend between slots 9 and 15 and 10 and 14 for respective spans of six and four. It will also be seen that coil 57b of pole group IB extends between slots 4 and 8 for a span of four and that coil 257c of pole group VC extends between slots 12 and 16 for a span of four. Thus, and consistent with the system employed in Fig. 3, coils 255, 155 and 55 are identified as having N6 turns by virtue of their span of six, and the coils 256, 156, 56, 257, 157, and 57 are designated as having N4 turns by virtue of their span of four.

It will now be seen that, in common with the embodiment of Figs. 1 through 4, inclusive, each pair of adjacent pole groups of each phase comprises an odd number of coils, in this instance three; it is also seen that one coil only of each adjacent pair of pole groups of each winding phase, e.g., 255, 155 and 55, have a 100% span, e.g., in this case six, with the remaining coils in the same groups as the 100% span coils decreasing their spans in steps of two slots, e.g., coils 256, 156 and 56 with spans of four. Likewise, the coils of the other pole group of each adjacent pair of pole groups have a one-to-one correspondence in both span and turns with the coils of the first pole group of the pair other than the 100% span coil. In addition, it is seen that in common with the embodiment of Figs. 1 through 4, the 100% span coil fully occupies its slots while the coils identified as having N4 turns share their respective slots. Thus, in the embodiment of Figs. 1 through 3, and with particular reference to Fig. 6, it is seen that each slot contains either a winding having N6 turns or two windings each having N4 turns and thus $N6=2N4$ for equal slot fullness. In this embodiment, it will be observed that no flexibility in turns per coil of the coils having less than 100% span is possible and thus in turn no control of space harmonic mmfs is possible.

It is seen that in the concentric winding arrangement of Figs. 5 through 7, the coil-to-slot ratio is 3/4 that is, twenty-seven coils for a thirty-six slot six pole winding. It will, however, be seen that while it is desirable to maintain the ratio of coils to slots below one, one coil having a span of two, i.e., an N2 coil could be added to each pole group thus making the coil-to-slot ratio 5/4, i.e., forty-five coils for a thirty-six slot six pole winding. In that case, for equal slot fullness, each slot would have $N6+2N2$ turns or as before, 2N4 turns.

While the concentric winding arrangement of Figs. 5 through 7 has been shown embodied in a thirty-six slot, six pole stator core member, it will be readily apparent that the same concentric winding arrangement may be provided in any stator core member having the same number of slots per pole, i.e., six, thus, the concentric winding arrangement of Figs. 5 through 7 may be embodied in a forty-eight slot, eight pole stator core member, etc.

It will now be seen that in the type (a) concentric winding arrangements shown in Figs. 1 through 4, inclusive, and 5 through 7, inclusive, adjacent pole groups of each winding phase have unequal spans with one pole group of each adjacent pair having a 100% span and the other pole group having less than a 100% span, each pair of adjacent pole groups having a 200% total span and being symmetrical with all other adjacent pairs of pole groups. In addition, in the type (a) concentric winding configurations, each pole group having a 100% span has one coil only with a 100% span, the remaining coils of that pole group having spans decreasing in steps of two slots with the other pole group of the pair having its coils respectively equal in span and turns to the coils of its adjacent 100% span pole group excepting the 100% span coil. Furthermore, it is seen that each adjacent pair of pole groups has an odd number of coils, that equal slot fullness may be provided in both embodiments, and that flexibility in turns per coil to provide control of space harmonic mmfs is provided in the embodiments of Figs. 1 through 4, inclusive.

Figure 10:
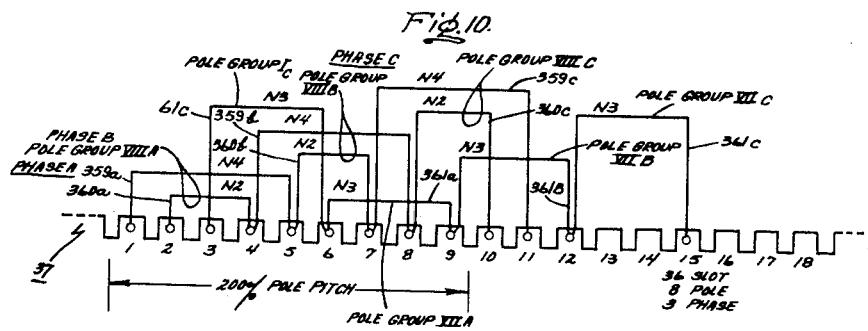
Fig. 10 is a diagrammatic view of the winding arrangement of Fig. 8 useful in explaining the same.
Figure 8:
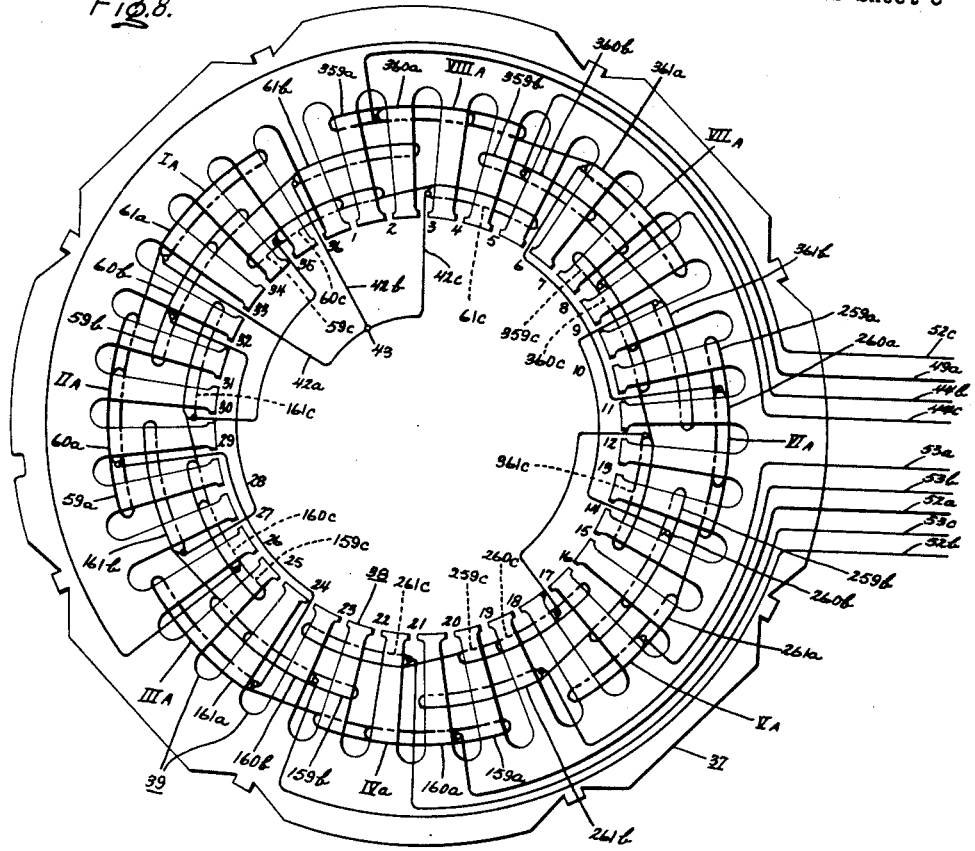
Fig. 8 is still another schematic view of a thirty-six slot stator core member for a three phase alternating current induction motor incorporating still another embodiment of our concentric winding arrangement arranged to provide eight poles.
Figure 9:
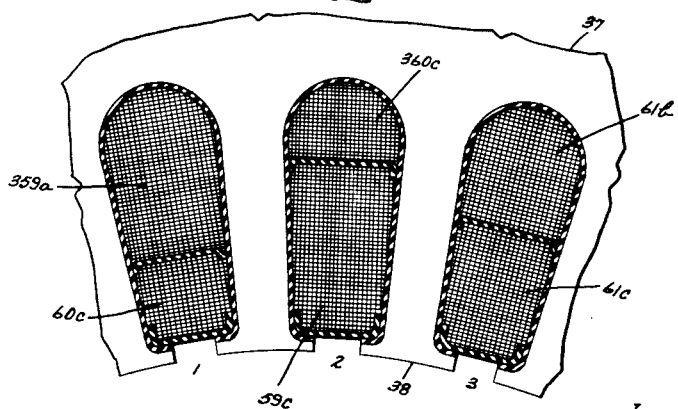
Fig. 9 is a fragmentary view, partly in cross-section, showing the distribution of the coils of the winding of Fig. 8 within the slots of the stator core member.

Referring now to Figs. 8, 9 and 10, there is shown a concentric winding arrangement of the (b) type embodied in an eight pole, thirty-six slot stator core member 37 (like elements again being indicated by like reference numerals). Here it will be recalled that in the (b) type concentric winding arrangement of our invention, the stator slots per pole is a non-integer, however, an integral number of stator slots per pair of poles is provided, i.e., in this case, nine. Thus, since the pole pitch is four and one-half, a 100% pitch coil is impossible.

Referring now to Figs. 8 and 10, it will be seen that with an eight pole winding, each winding phase A through C comprises eight pole groups, I through VIII, and it will be observed that in each winding phase, pole groups VIII, VI, IV and II comprise two coils 359 and 360, 259 and 260, 159 and 160, and 59 and 60, whereas the alternate pole groups, VII, V, III and I comprise single coils 361, 261, 161, and 61. Additionally it will be observed that the two coils respectively comprising the pole groups VIII, VI, IV and II respectively have spans of four and two slots, whereas the coils forming the pole groups VII, V, III and I each have a span of three slots.

It will now be seen that in the embodiment of Figs. 8 through 10, inclusive, the span of the largest span coil in a pair of adjacent pole groups in a given winding phase is limited to slots per pole minus one-half, i.e., four, with the additional coils, (in this case, one), in such a pole group decreasing in spans of two, e.g., yielding a span of two. It will further be seen that in order to provide a total 200% span for each pair of adjacent pole groups of each winding phase, it is necessary that the other pole group, i.e., the coils 361, 261, 161 and 61 have a span of three. Thus, the largest coil of the pole group adjacent the pole groups in which the largest coil has a span of slots per pole minus one-half, has a span equal to slots per pole minus one and one-half, i.e., in this case three, with additional coils, if any (in this case none) again decreasing in steps of two.

Referring now additionally to Fig. 9, and using the same identification system as that used in the previous embodiments, the coils having a span of four slots, i.e., 359, 259, 159 and 59 are identified as N4, the coils having a span of three slots, i.e., 361, 261, 161 and 61 are identified as N3 and the coils having a span of two, i.e., 360, 260, 160 and 60 are identified as N2. Thus, for equal slot fullness, each slot has N4+N2 turns or N3+N3 turns, i.e., N4+N2=2N3.

It will now be seen that with the type (b) concentric winding arrangement of Figs. 8 through 10, inclusive, adjacent pole groups of each winding phase have unequal spans, alternate pole groups in each winding phase have equal spans with an equal number of coils respectively having an equal number of turns, and each adjacent pair of pole groups is symmetrical with all other adjacent pairs of pole groups. It will, however, be observed that in the embodiment of Figs. 8 through 10, inclusive, the pole groups VII, V, III and I respectively adjacent the pole groups VIII, VI, IV and II have no correspondence, either in spans or turns, with any coil thereof. It will also be observed that the type (b) concentric winding arrangement of Figs. 8, 9 and 10 is equally suitable for use in any stator core member in which the ratio of slots per pair of poles is the same, i.e., nine, for example four pole, eighteen slot, etc. It will be observed that the concentric winding arrangement of Figs. 8 through 10, inclusive, has a coil to slot ratio of 1.0 with variations in the $N4/N2$ turns ratio being permitted so long as $N4+N2=2N3$.

Turning now finally to Figs. 11, 12 and 13, there is shown another type (b) concentric winding arrangement in accordance with our invention embodied in a four pole, thirty slot stator member 37 (like parts again being indicated by like reference numerals). Here, with four poles being provided, each winding phase A through C comprises four pole groups, I, II, III and IV. It will here be observed that the pole groups IV and II comprise two coils 163, 164, and 63, 64 and that the respectively adjacent pole groups III and I likewise comprise two coils 165, 166, and 65 and 66 respectively. It will further observed that the coils 163, 164, and 63, 64 of the pole groups IV and II respectively have spans of seven and five slots whereas the coils 165, 166, and 65, 66 of the pole groups III and I respectively have spans of six and four slots. It will now be observed again that the largest span coil in any pair of adjacent pole groups in any winding phase has a span limited to slots per pole (in this case seven and one-half) minus one-half, and thus the coils 163 and 63 of the pole groups IV and II respectively have spans of seven slots. Also, in common with the embodiment of Figs. 8 through 10, the additional coils of such pole groups have their spans decreasing in spans of two, and thus the coils 164 and 64 of pole groups IV and II respectively have spans of five slots. Likewise, and also in common with the embodiment of Figs. 8 through 10, inclusive, the pole groups adjacent the pole groups having the largest span coils have their largest coil with a span equal to slots per pole minus one and one-half and thus, in this embodiment, coils 165 and 65 of pole groups III and I have spans of six, the additional coils, if any (in this case one) again decreasing in steps of two slots so that the coils 166 and 66 of pole groups III and I respectively have spans of four slots. Again it is seen that adjacent pole groups of each winding phase have no correspondence either in spans or the number of turns; however, while adjacent pole groups of each winding phase are unequal in every respect, i.e., spans and turns, it will be seen that adjacent pairs of pole groups have a total span of 200% and that all adjacent pairs of pole groups are symmetrical, i.e., identical in spans, number of coils and turns.

It is seen that in the embodiment of Figs. 11 through 13, inclusive, the ratio of coils to slots is 4/5 and that equal slot fullness may be maintained since every slot has either one N7 coil, or two N5 coils, or an N4 coil plus an N6 coil, i.e., $N7=2N5=N4+N6$ for equal slot fullness. With this arrangement, therefore, it is seen that variation in turns per coil is permitted only in the N4 and N6 turns coils, i.e., 165, 166, and 65, 66. It will further be seen that in the embodiment of Figs. 11 through 13, one additional coil having a span of three (and thus to be identified as N3) can be added to the pole groups IV and II thus increasing the coil to slot ratio to 1.0. Likewise, the coil to slot ratio may be reduced to 3/5, the coils having N4 turns, i.e., 166 and 66, being eliminated, thereby simplifying the winding, but relinquishing all control over space harmonic mmfs since this control was effected by permissible variation in the $N4/N6$ turns ratio.

In the design of concentric polyphase windings of the type described above which are asymmetrical between adjacent poles and symmetrical between adjacent pairs of poles, with $N$=number of slots
$P$=number of poles
$\phi$=number of phases the type (a) concentric winding arrangement described above requires that $N/P$=an integer and that $N/P\phi$=an integer in order that all phases may be identical. The span of the largest coil is then made $N/P$ and the spans of the other coils in the same pole group as the largest coil will then be $$\frac{N}{P}-2, \frac{N}{P}-4$$

etc. and the spans of the coils in the adjacent pole groups of each phase will be $$\frac{N}{P}-2, \frac{N}{P}-4$$

etc. This is in direct contrast with the windings of the above mentioned application and patent of George B. Dunn, Jr. in which the spans of the coils are $$\frac{N}{P}-1, \frac{N}{P}-3, \frac{N}{P}-5$$

etc. with all pole groups being identical.

In the type $(b)$ concentric winding arrangement described above, it is required that $N/P=$ a non-integer, that $2N/P=$ an integer, and also that $2N/P\phi$ be an integer for all phases to be identical. Here the span of the largest coil is $N/P-\frac{1}{2}$ with the spans of other coils in the same pole group being $$\frac{N}{P}-2\frac{1}{2}, \frac{N}{P}-4\frac{1}{2}$$

etc., and the spans of the coils in the adjacent pole groups of each winding phase will be $$\frac{N}{P}-1\frac{1}{2}, \frac{N}{P}-3\frac{1}{2}$$

etc.

In both the type $(a)$ and type $(b)$ concentric winding arrangements of our invention, the coil spans can be expressed as $$\frac{N}{P}-\frac{X}{2}$$

where X is given by a progression. For the type $(a)$ concentric winding arrangement, X for one pole is given by the progression $X=0, 4, 8$, etc. and for the adjacent poles $X=4, 8$, etc. In the type $(b)$ concentric winding arrangement X for one pole group is given by the progression $X=1, 5, 9$, etc., and for the adjacent poles by $X=3, 7, 11$, etc. In the conventional concentric winding arrangements known to the present applicants, X is given by the progression $X=2, 6, 10$, etc. with all pole groups being identical.

If the largest value of X in the above progressions for the coil span is called $X_{max}$, then the number of coils per phase per pair of poles is given by:

type $(a)$
$$\frac{X_{max}}{2}+1$$

type $(b)$
$$\frac{X_{max}+1}{2}$$

As indicated previously, while our concentric winding arrangements may be employed in situations where the total number of coils exceed the number of slots, it is considered normally desirable to limit the total number of coils to not more than the total number of slots so that not more than two coil sides are present in each slot. Under these conditions, the maximum number of coils per phase per pair of poles is:

$$\frac{2N}{P\phi}$$

and thus, in the type $(a)$ arrangement, since the largest pitch coil is always alone in a slot, the maximum number of coils per phase per pair of poles becomes:

$$\frac{2N}{P\phi}-1$$

thus, $$\frac{X_{max}}{2}+1=\frac{2N}{P\phi}-1$$

and solving for $X_{max}$, $$X_{max}=\frac{4N}{P\phi}-4$$

In type $(b)$ concentric winding arrangements, $$\frac{X_{max}+1}{2}=\frac{2N}{P\phi}$$

and thus solving for $X_{max}$ $$X_{max}=\frac{4N}{P\phi}-1$$

In each of the two types of concentric winding arrangements described above, $X_{max}$ is the limit for X (the progression giving coil span) so as not to exceed two coil sides per slot.

If the various coils are designated by their values of X in the progression for the span, then the coil sides which will appear together in the various slots may be tabulated as follows:

Type $(a)$

| Slot number: | X |
|---|---|
| 1 | 0 alone. |
| 2 | 4 and $X_{max}$. |
| 3 | 8 and $X_{max}-4$. |

Type $(b)$

| Slot number: | X |
|---|---|
| 1 | 1 and $X_{max}$. |
| 2 | 3 and $X_{max}-2$. |
| 3 | 5 and $X_{max}-4$. |

In the above tabulations, the slot numbers have no significance with respect to the figures of the drawing, but merely indicate that there are some slots with this combination of coil sides therein.

If $C_X$ represents the number of turns in coil X, then for equal slot fullness in all slots, it is necessary to have:

Type $(a)$
$$C_0=C_4+C_{X_{max}}=C_8+C_{X_{max}-4}=\text{etc.}$$

Type $(b)$
$$C_1+C_{X_{max}}=C_3+C_{X_{max}-2}=C_5+C_{X_{max}-4}=\text{etc.}$$

It will now be understood that some coils may be eliminated; for example, in the type $(b)$ concentric winding arrangement of our invention, if the smallest coil is eliminated, $C_{X_{max}}=0$ and thus $C_1$ fills a complete slot. In this case:

$$C_1=C_3+C_{X_{max}-2}=\text{etc.}$$

Applying now the formulae set forth above in the four pole thirty-six slot three phase motor of Figs. 1 through 4, inclusive, it is seen that:

$$N=36$$
$$P=4$$
$$\phi=3$$

thus $$\frac{N}{P}=\frac{36}{4}=9$$

(an integer) and thus the type $(a)$ concentric winding arrangement. $X_{max}$ is then found by:

$$X_{max}=\frac{4N}{P\phi}-4=\frac{4\times 36}{4\times 3}-4=8$$

and thus the progression for X is:

$X=0, 4, 8$ in one pole, and
$X=4, 8$ in the adjacent poles

Then the spans found from $$\frac{N}{P} - \frac{X}{2}$$

are:

9, 7, and 5 in one pole, and
7 and 5 in the adjacent poles

This corresponds with the arrangement of the illustrated embodiment of Figs. 1 through 4, inclusive, in which pole groups IV and II respectively have their coils 148, 149, and 150 and 48, 49 and 50 with spans of 9, 7 and 5 coils respectively, and the pole groups III and I respectively have their coils 146, 147 and 46 and 47 with spans of 7 and 5 slots respectively. It is also seen that in the type (a) concentric winding arrangement of our invention, the criterion for equal slot fullness indicates that the number of turns in the largest pitch coil, i.e., coils 148 and 48 in the embodiment of Figs. 1 through 4, inclusive, should be equal to the sum of the turns in the other two coils, i.e., coils 149 and 150, and 49 and 50. Furthermore, the number of turns in the coils with spans of seven and five, e.g., 146 and 147, and 46 and 47, may be relatively adjusted to control harmonics, subject only to the restriction that the sum of their turns must be equal to the number of turns in the largest pitch coils 148, and 48.

It will now be seen that we have provided an improved polyphase concentric winding arrangement for polyphase dynamoelectric machines which is suitable for use in machines in which the slots per pole is a non-integer and also in arrangements where the slots per pole is an integer. The concentric winding arrangement of this application is the only concentric winding arrangement known to the present applicants which will provide equal slot fullness in situations where the number of slots per pole is a non-integer. Furthermore, in certain instances where the number of slots per pole is an integer (thus permitting the use of prior concentric winding arrangements), the present concentric winding arrangement permits the use of a reduced number of coils while still maintaining equal slot fullness.

While our improved concentric winding arrangement in which adjacent poles of each winding phase are asymmetrical, and adjacent pairs of poles are symmetrical finds particular utility in connection with polyphase alternating current induction motors, it is equally applicable to other types of polyphase alternating current dynamoelectric machines, such as synchronous motors.

While we have illustrated and described some specific embodiments of our invention, further modifications and improvements will occur to those skilled in the art, and we desire therefore, in the appended claims, to cover all modifications which do not depart from the spirit and scope of our invention.

What we claim as new and desire to secure by Letters Patent of the United States is:

1. In a polyphase alternating current dynamoelectric machine: a magnetic core member having a plurality of winding slots formed in an air gap defining surface thereof; and a concentric winding positioned in said slots and having a plurality of phases, each of said winding phases having an even number of groups of coils disposed to form a corresponding even number of poles in said core member, the span of each pole group of each winding phase being different than the span of its adjacent pole group, each adjacent pair of pole groups of each winding phase having the same total span as all other adjacent pairs of pole groups of said winding; each slot of said core member having a side of at least one coil disposed therein, the number of turns in the coils of each pole group being so related to the number of turns in the coils of its adjacent pole group that all slots of said core member have an equal number of turns therein.

2. In a polyphase alternating current dynamoelectric machine: a magnetic core member having a plurality of winding slots formed in an air gap defining surface thereof; and a concentric winding positioned in said slots and having a plurality of phases, each of said winding phases having an even number of groups of coils in excess of two disposed to form at least two pairs of poles in said core member, the span of each pole group of each winding phase being different from the span of its adjacent pole group and adjacent pairs of pole groups of each winding phase having the same total span as all other adjacent pairs of pole groups of said winding, alternate pole groups of each winding phase having an equal number of coils respectively having equal numbers of turns.

3. In a polyphase alternating current dynamoelectric machine: a magnetic core member having a plurality of winding slots formed in an air gap defining surface thereof; and a concentric winding positioned in said slots and having a plurality of phases, each of said winding phases having an even number of sections disopsed to form a corresponding even number of poles in said core member, said core member having an integral number of slots per pole, one section of each adjacent pair of winding sections of each winding phase spanning all of its respective pole and its adjacent section spanning less than all of its respective pole, each adjacent pair of winding sections of each winding phase being symmetrical with all other adjacent pairs of winding sections of said winding.

4. In a polyphase alternating current dynamoelectric machine: a magnetic core member having a plurality of winding slots formed in an air gap defining surface thereof; and a concentric winding positioned in said slots and having a plurality of phases, each of said winding phases having an even number of groups of coils disposed to form a corresponding even number of poles in said core member, said core member having an integral number of slots per pole, one pole group of each pair of adjacent pole groups of each winding phase spanning all of its respective pole and its adjacent pole group spanning less than all of its respective pole, each adjacent pair of pole groups of each winding phase having an odd number of coils and being symmetrical with all other adjacent pairs of pole groups of said winding.

5. In a polyphase alternating current dynamoelectric machine: a magnetic core member having a plurality of winding slots formed in an air gap defining surface thereof; and a concentric winding positioned in said slots and having a plurality of phases, each of said winding phases having an even number of groups of coils disposed to form a corresponding even number of poles in said core member, said core member having an integral number of slots per pole, a first pole group of each pair of adjacent pole groups of each winding phase having one coil spanning all of its respective pole and its remaining coils decreasing their spans in steps of two slots, the coils of the second pole group of each of said adjacent pairs of pole groups being equal in number to the said remaining coils of the first pole groups and respectively having the same spans and number of turns whereby the first and second pole groups of each adjacent pair of pole groups of each winding phase have unequal spans and each adjacent pair of pole groups of each winding phase is symmetrical with all other adjacent pairs of pole groups of said winding.

6. In a polyphase alternating current dynamoelectric machine: a magnetic core member having $N$ winding slots formed in an air gap defining surface thereof; and a concentric winding positioned in said slots and having $\phi$ phases, each of said winding phases having an even number of groups of coils disposed to form a corresponding number $P$ poles in said core member, $N/P$ being an integer and $N/P\phi$ being an integer, a first pole group of each pair of adjacent pole groups of each winding phase having one coil with a span $N/P$ with its remaining coils having spans of $$\frac{N}{P}-2, \frac{N}{P}-4$$

etc., the coils of the second pole group of each of said adjacent pair pole groups having spans of $$\frac{N}{P}-2, \frac{N}{P}-4$$

etc. and being equal in number to said remaining coils of the first pole groups and respectively having the same number of turns.

7. In a polyphase alternating current dynamoelectric machine: a magnetic core member having $N$ winding slots formed in an air gap defining surface thereof; and a concentric winding positioned in said slots and having $\phi$ phases, each of said winding phases having an even number of groups of coils disposed to form a corresponding number of $P$ poles in said core member, $N/P$ being an integer and $N/P\phi$ being an integer, the first and second pole groups of each adjacent pair of pole groups of each winding phase having coil spans $$\frac{N}{P}-\frac{X}{2}$$

where $X$ for the first pole group is given by the progression $X=0, 4, 8$ etc. and $X$ for the second pole group is given by the progression $X=4, 8$ etc., the largest value of $X$ in said progression being $X_{max}$ and the number of coils per pair of adjacent pole groups for each winding phase being $$\frac{X_{max}}{2}+1$$

with $$X_{max}=\frac{4N}{P\phi}-4$$

the largest pitch coil of each pair of pole groups having its sides respectively alone in a pair of core member winding slots.

8. In a polyphase alternating current dynamoelectric machine: a magnetic core member having $N$ winding slots formed in an air gap defining surface thereof; and a concentric winding positioned in said slots and having $\phi$ phases, each of said winding phases having an even number of groups of coils disposed to form a corresponding number $P$ poles in said core member, $N/P$ being an integer and $N/P\phi$ being an integer, the first and second pole groups of each adjacent pair of pole groups of each winding phase having coil spans $$\frac{N}{P}-\frac{X}{2}$$

where $X$ for the first pole group is given by the progression $X=0, 4, 8$ etc. and $X$ for the second pole group is given by the progression $X=4, 8$ etc. the largest value of $X$ in said progressions being $X_{max}$ and the number of coils per pair of adjacent pole groups for each winding phase being $$\frac{X_{max}}{2}+1$$

with $$X_{max}=\frac{4N}{P\phi}-4$$

the largest pitch coil of each pair of pole groups having its sides respectively alone in a pair of core member slots; each slot of said core member having a side of at least one coil disposed therein with $C_X$ representing the number of turns in coil $X$ and $$C_0 = C_4 + C_{X_{max}} = C_8 + C_{X_{max}-4} = \text{etc.}$$

whereby all slots of said core member have essentially an equal number of turns therein.

9. In a polyphase alternating current dynamoelectric machine: a magnetic core member having a plurality of winding slots formed in an air gap defining surface thereof; and a concentric winding positioned in said slots and having a plurality of phases, each of said winding phases having an even number of sections disposed to form a corresponding even number of poles in said core member, said core member having a non-integral number of slots per pole and an integral number of slots per pair of poles, the pitch of adjacent sections of each winding phase being unequal, each pair of adjacent sections of each winding phase being symmetrical with all other pairs of adjacent sections.

10. In a polyphase alternating current dynamoelectric machine: a magnetic core member having a plurality of winding slots formed in an air gap defining surface thereof; and a concentric winding positioned in said slots and having a plurality of phases, each of said winding phases having a non-integral number of slots per pole and an even number of groups of coils disposed to form a corresponding even number of poles in said core member, said core member having an integral number of slots per pair of poles, a first pole group of each pair of adjacent pole groups of each winding phase having one coil spanning half of the pitch of two poles minus one-half slot with its remaining coils decreasing their spans in steps of two slots, the second pole group of each of said adjacent pairs of pole groups having one coil spanning half of the pitch of two poles minus one and one-half slots with its remaining coils decreasing in steps of two slots.

11. In a polyphase alternating current dynamoelectric machine: a magnetic core member having $N$ winding slots formed in an air gap defining surface thereof; and a concentric winding positioned in said slots and having $\phi$ phases, each of said winding phases having an even number of groups of coils disposed to form a corresponding number of $P$ poles in said core member, $N/P$ being a non-integer and $2N/P$ and $2N/P\phi$ being integers, a first pole group of each pair of adjacent pole groups of each winding phase having one coil with a span of $$\frac{N}{P}-\frac{1}{2}$$

and its remaining coils having spans of $$\frac{N}{P}-2\frac{1}{2}, \frac{N}{P}-4\frac{1}{2}$$

etc., the coils of the second pole group of each of said adjacent pole groups having spans of $$\frac{N}{P}-1\frac{1}{2}, \frac{N}{P}-3\frac{1}{2}$$

etc.

12. In a polyphase alternating current dynamoelectric machine: a magnetic core member having $N$ winding slots formed in an air gap defining surface thereof; and a concentric winding positioned in said slots and having $\phi$ phases, each of said winding phases having an even number of groups of coils disposed to form a corresponding number $P$ poles in said core member, $N/P$ being a non-integer and $2N/P$ and $2N/P\phi$ being integers, the first and second pole groups of each adjacent pair of pole groups of each winding phase having coil spans of $$\frac{N}{P}-\frac{X}{2}$$

where $X$ for the first pole group is given by the progression $X=1, 5, 9$ etc. and $X$ for the second pole is given by the progression $X=3, 7, 11$ etc. the largest value of $X$ in said progressions being $X_{max}$ and the number of coils per pair of adjacent pole groups for each winding phase being $$\frac{X_{max}+1}{2}$$

with $$X_{max} = \frac{4N}{P\phi} - 1$$

13. In a polyphase alternating current dynamoelectric machine: a magnetic core member having N winding slots formed in an air gap defining surface thereof; and a concentric winding positioned in said slots and having $\phi$ phases, each of said winding phases having an even number of groups of coils disposed to form a corresponding number P poles in said core member, $N/P$ being a non-integer and $2N/P$ and $2N/P\phi$ being integers, the first and second pole groups of each adjacent pair of pole groups of each winding phase having coil spans of $$\frac{N}{P} - \frac{X}{2}$$

where X for the first pole group is given by the progression $X=1, 5, 9$ etc. and X for the second pole is given by the progression $X=3, 7, 11$ etc., the largest value of X in said progressions being $X_{max}$ and the number of coils per pair of adjacent pole groups for said winding phase being $$\frac{X_{max}+1}{2}$$

with $$X_{max} = \frac{4N}{P\phi} - 1$$

each slot of said core member having a side of at least one coil disposed therein with $C_X$ representing the number of turns in coil X and $$C_1 + C_{X_{max}} = C_3 + C_{X_{max}-2} = C_5 + C_{X_{max}-4} = \text{etc.}$$

whereby all slots of said core member have essentially an equal number of turns therein.

References Cited in the file of this patent

UNITED STATES PATENTS

| | | |
|---|---|---|
| 2,697,809 | Hutchins | Dec. 21, 1954 |
| 2,796,543 | Dunn | June 18, 1957 |

OTHER REFERENCES

Richter, Rudolf, Ankerwicklungen for Gleich- Und Wechslestrom-maschinen, Julius Springer, Berlin, 1920, p. 184 Figs. 163 and 164.